(No Model.)
J. J. BAUSCH.
FRAME FOR EYEGLASSES.
No. 489,358. Patented Jan. 3, 1893.
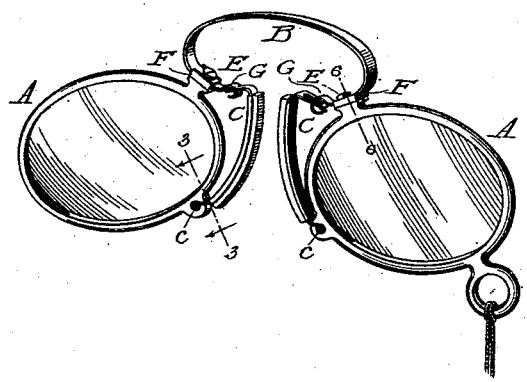
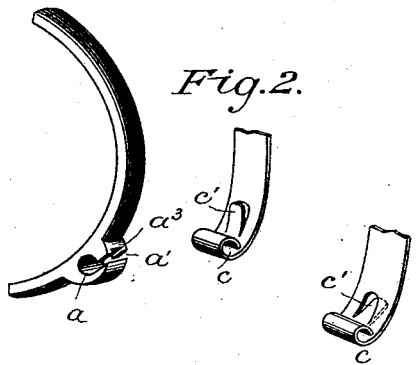 
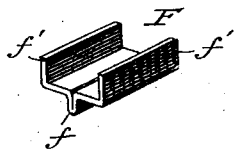 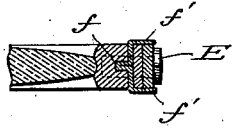
Witnesses
Raymond T. Barnes.
F. S. Elmore.
Inventor
J. J. Bausch
By P. T. Dodge
Attorney

United States Patent Office.

JOHN J. BAUSCH, OF ROCHESTER, NEW YORK, ASSIGNOR TO THE BAUSCH & LOMB OPTICAL COMPANY, OF SAME PLACE.

FRAME FOR EYEGLASSES.

SPECIFICATION forming part of Letters Patent No. 489,358, dated January 3, 1893.

Application filed July 29, 1892. Serial No. 441,548. (No model.)

*To all whom it may concern:*

Be it known that I, JOHN J. BAUSCH, of Rochester, county of Monroe, and State of New York, have invented a new and useful Improvement in Frames for Eyeglasses, of which the following is a specification.

The object of this invention is to provide for the cheap and secure attachment of the nose-pieces, the connecting spring or bow, and other portions of eye-glass frames to the bezel or frame which carries the glass.

With this object in view I coil the end of the metallic nose-piece, spring, or other portion into a cylindrical form, and slip this enlarged end edgewise into a corresponding opening formed in the frame or bezel. In order to prevent its escape, I provide the inserted member with a lip or projection of any suitable form adapted to fit into a corresponding depression in the frame, this lip being preferably made in the form of a spring, so that it may be readily depressed and released when the parts are to be separated.

Referring to the accompanying drawings,—

Figure 1 is a perspective view of a pair of eyeglasses having my improvement incorporated therein. Fig. 2 is a perspective view of one of the frames and of one end of a nose piece adapted for attachment thereto. Fig. 3 a cross-section on the line 3—3 of Fig. 1. Fig. 4 a perspective view showing another form of the nose-piece. Fig. 5 is a perspective view of one of the clips employed for connecting the ends of the bow with the frame. Fig. 6 is a cross-section of the same on the line 6—6 of Fig. 1.

Referring to the drawings: A A represent the two oval frames or bezels in which lenses are mounted as usual, and B the customary spring or bow by which they are connected.

C C represent the nose-pieces, each consisting in the present instance of a metallic arm or spring, faced with cork or other suitable material, its lower end being joined tightly to the frame, and its upper end slotted and connected to the inner end of the spring in such manner as to permit lateral motion. Instead of attaching these nose pieces to the frame as usual, I now bend the lower end of each into a cylindrical or equivalent form, as shown at $c$. Through the edge of the frame I drill, as shown in Fig. 2, a transverse hole $a$, from which a slit $a'$ is extended to the outer edge. The nose piece or spring is inserted by slipping it edgewise into the slot in the frame, seating its enlarged or cylindrical end in the hole $a$, as plainly represented in Fig. 1.

In order to prevent the accidental escape of the spring, I provide the same with a lip or projection $c'$, and provide the frame with a corresponding notch $a^3$, so that when the spring is slipped laterally to its place, in the frame, the lip will spring outward into the notch as shown in Figs. 1 and 3, and thus hold the parts together. This lip is preferably formed by punching through the spring, as shown in Figs. 3 and 4. It may be punched through on the outer side, as shown in Fig. 2, so as to bear against a notch at the upper side of the slit $a'$, or it may be punched through on the back, as shown in Fig. 4, to engage a notch below the slit $a'$, or it may be formed in any other suitable manner the only requirement being that the end of the spring or nose piece shall have a projection of such character that it will interlock with the frame to prevent lateral disengagement of the parts. The ends of the bow B, are turned inward and each secured to the frame by a screw E, passing therethrough into a boss or projection on the frame.

In order to prevent the frame from twisting or turning out of position in relation to the spring, I introduce between the spring and frame, a clip plate F, such as shown in detail in Fig. 5, constructed preferably from sheet metal with a rib $f$, on one side to enter a corresponding groove in the frame, and with two flanges $f'$, projecting forward along its edges to embrace the edges of the spring which is seated between them. The bolt passes through the spring, and the clip plate, into the frame. The rib on the back of the plate prevents its turning, and its flanges keep the spring from turning, and thus it is that the several parts are held in their proper relations.

I commonly employ at each end of the spring, a supplemental arm G, having its end adapted to hook through a slot in the upper end of the nose-piece as in other frames.

When this supplemental piece is used it will also be seated between the flanges of the clip plate and secured by the screw E.

Having thus described my invention what I claim is,—

1. As an improvement in eye-glasses the frame having a transverse opening through it, and a contracted slot running therefrom through the edge, in combination with the metallic member, having an enlarged end seated in its opening.

2. As an improvement in eye-glasses a frame having a transverse opening, $a$, a slit $a'$ therein, in combination with a frame member, having its end coiled or bent into enlarged form, and seated in the frame, substantially as described.

3. As an improvement in eye-glasses a frame provided with a transverse opening in its edge, in combination with a frame member having its end seated in said opening and provided with a lip or projection to interlock with the frame and prevent accidental separation of the parts.

4. A frame member for an eye-glass having its end coiled or turned back to form a cylindrical rib, and having on one of its faces, near the ribbed end, a projecting lip.

5. In combination with the frame having a transverse opening $a$, slit $a'$ and notch $a^3$, the frame member C having the coiled end $c$ and lip $c'$.

6. In an eye-glass the combination with the clip having on its upper side a channel and on its under side a rib, of the frame having a grooved seat for the clip, and the bow seated in the channel of the clip.

In testimony whereof I hereunto set my hand, this 13th day of April, 1892, in the presence of two attesting witnesses.

JOHN J. BAUSCH.

Witnesses:
W. R. KENNEDY,
F. S. ELMORE.